(12) United States Patent
Neitz et al.

(10) Patent No.: US 11,945,326 B2
(45) Date of Patent: Apr. 2, 2024

(54) METHOD AND CHARGING DEVICE FOR CHARGING A HIGH-VOLTAGE BATTERY OF AN ELECTRIC VEHICLE

(71) Applicants: PREH GMBH, Bad Neustadt a. d. Saale (DE); BRUSA ELEKTRONIK AG, Sennwald (CH)

(72) Inventors: Marc Neitz, Oberelsbach (DE); Alexander Matthias, Kaltennordheim (DE); Axel Krause, Nesslau (CH); Andreas Kruspan, Grabs (CH); Marc Hanselmann, Fruemsen (CH); Hannes Hobi, Sargans (CH); Rudolf Meusburger, Bezau (AT)

(73) Assignees: PREH GMBA, Bad Neustadt a.d. Saale (DE); BRUSA ELEKTRONIK AG, Sennwald (CH)

( * ) Notice: Subject to any disclaimer, the term of this patent is extended or adjusted under 35 U.S.C. 154(b) by 563 days.

(21) Appl. No.: 17/126,055

(22) Filed: Dec. 18, 2020

(65) Prior Publication Data
US 2021/0138924 A1    May 13, 2021

(51) Int. Cl.
| | |
|---|---|
| *H02J 7/00* | (2006.01) |
| *B60L 53/16* | (2019.01) |
| *B60L 53/20* | (2019.01) |
| *B60L 53/31* | (2019.01) |
| *B60L 53/62* | (2019.01) |
| *H02J 7/14* | (2006.01) |

(52) U.S. Cl.
CPC ............ *B60L 53/62* (2019.02); *B60L 53/16* (2019.02); *B60L 53/20* (2019.02); *B60L 53/31* (2019.02); *H02J 7/0045* (2013.01); *B60L 2210/14* (2013.01); *H02J 2207/20* (2020.01)

(58) Field of Classification Search
CPC .......... B60L 53/62; B60L 53/20; B60L 53/16; B60L 53/31; B60L 2210/14; H02J 7/0045; H02J 2207/20
See application file for complete search history.

(56) References Cited

U.S. PATENT DOCUMENTS

| | | | | |
|---|---|---|---|---|
| 2007/0188134 | A1* | 8/2007 | Hussain | H02J 7/0071 320/114 |
| 2012/0038215 | A1* | 2/2012 | Berry | B60L 50/62 307/77 |
| 2015/0061376 | A1* | 3/2015 | Hartl | B60L 1/02 307/116 |
| 2015/0197153 | A1* | 7/2015 | Luedtke | B60L 3/12 324/503 |
| 2016/0347197 | A1* | 12/2016 | Fink | H02J 7/0024 |
| 2018/0111498 | A1* | 4/2018 | Chen | B60L 58/21 |

(Continued)

FOREIGN PATENT DOCUMENTS

| | | | |
|---|---|---|---|
| WO | WO 2020/248023 A1 | 12/2020 | |
| WO | WO-2020248023 A1 * | 12/2020 | ............. B60L 50/60 |

*Primary Examiner* — Alexis B Pacheco
(74) *Attorney, Agent, or Firm* — Norman B. Thot

(57) ABSTRACT

A method for charging a high-voltage battery of an electric vehicle, comprising: providing the high-voltage battery having a nominal battery voltage; providing a charging station outputting a DC charging voltage; selectively pre-charging a second charging terminal of the charging station to a predetermined pre-charge voltage using a controllably limited pre-charge current supplied by electric power from the high-voltage battery.

19 Claims, 2 Drawing Sheets

(56) References Cited

U.S. PATENT DOCUMENTS

| | | | |
|---|---|---|---|
| 2019/0187211 A1* | 6/2019 | Müller | H02J 7/345 |
| 2020/0164755 A1* | 5/2020 | Smolenaers | H02J 3/322 |
| 2020/0235586 A1* | 7/2020 | Yang | H02J 7/00304 |
| 2020/0298722 A1* | 9/2020 | Smolenaers | H02J 7/345 |

* cited by examiner

METHOD AND CHARGING DEVICE FOR CHARGING A HIGH-VOLTAGE BATTERY OF AN ELECTRIC VEHICLE

FIELD OF THE INVENTION

The invention relates to a method and a charging device each for charging a high-voltage battery, and particularly to a method and a charging device each for charging a high-voltage battery of an electric vehicle (EV) such as a hybrid electric vehicle (HEV) or a battery electric vehicle (BEV).

BACKGROUND OF THE INVENTION

It is generally known that charging stations for hybrid or battery electric vehicles have large capacities at their high-voltage side. When starting power transfer from the charging station to the vehicle and the high-voltage battery, respectively, these capacities will cause large currents, i.e. transient compensating currents in the very beginning of the charging procedure, potentially damaging components of the charging station and/or the electric vehicle and/or the high-voltage battery.

Accordingly, what is needed are a method, a charging device, and an electric vehicle each being capable to charge a high-voltage battery of the vehicle at a charging station with improved performance, where performance is assessed on the qualities of safety of operation, reliability, efficiency, flexibility, as well as manufacturing ease and cost.

SUMMARY OF THE INVENTION

It is an object of the present invention to provide a method for charging a high-voltage battery of an electric vehicle, a charging device for charging a high-voltage battery of an electric vehicle, and an electric vehicle having a high-voltage battery, which facilitate safe, reliable, and efficient charging of the high-voltage battery at charging stations of different kinds, thus significantly increasing the possibilities of charging the electric vehicle at many different charging stations (worldwide).

The invention is defined by the independent claims. The dependent claims define advantageous embodiments.

It is to be noted that the individual features listed in the description below can be combined in any technically meaningful way with each other (also across different categories, such as, e.g., apparatus and method categories) and show further embodiments of the invention. The description of the invention is additionally characterized and specified particularly in connection with the figures.

Furthermore, it is to be understood that the term "and/or" or the expressions "at least one of" or "one or more of", if used herein in order to combine a first and a second feature, are to be construed as disclosing a first embodiment of the invention that comprises only the first feature, a second embodiment of the invention that comprises only the second feature, and a third embodiment of the invention that comprises both the first feature and the second feature. If more than two features are listed, also any combinations thereof are to be construed as disclosed embodiments according to the invention.

Still further, the terms "approximately", "essentially" or "about" indicate a range of tolerance which the skilled person in the field in question considers to be normal. In particular, the terms "approximately", "essentially" or "about" are to be understood as a tolerance range of the referred quantity of up to a maximum of +/−20%, preferably up to a maximum of +/−10%.

According to a first aspect, a method for charging a high-voltage battery of an electric vehicle (e.g. a hybrid electric vehicle (HEV) or a battery electric vehicle (BEV), wherein, without being limited thereto, the high-voltage battery may be a traction battery of the vehicle), comprises the steps: providing the high-voltage battery having a nominal battery voltage (e.g. 400 V or 800 V, however, without necessarily being limited thereto) between first and second battery terminals; providing a charging station outputting a DC charging voltage (e.g. 400 V or 800 V, however, without necessarily being limited thereto) between first and second charging terminals; electrically connecting the first and second charging terminals and the respective first and second battery terminals without electric power being transferred from the charging station to the high-voltage battery, wherein the second charging terminal is connected to the second battery terminal via a unidirectional power transfer component interposed therebetween only allowing unidirectional power flow from the second charging terminal to the second battery terminal; selectively pre-charging the second charging terminal to a predetermined pre-charge voltage using a controllably limited pre-charge current supplied by electric power from the high-voltage battery; and transferring electric power from the charging station to the high-voltage battery (i.e. charging the battery) after the predetermined pre-charge voltage has been attained at the second charging terminal of the charging station.

Pre-charging the second charging terminal of the charging station pre-charges the station-side capacities after the charging station is electrically connected to the high-voltage battery but before electric power is transferred from the charging station to the high-voltage battery, i.e. before the charging station begins to charge the high-voltage battery. Consequently, at the time of starting the power transfer from the charging station to the high-voltage battery, high compensating currents flowing between the charging station and the high-voltage battery, which may cause severe damages of components of the charging station and/or the electric vehicle and/or the high-voltage battery, are effectively prevented by the invention. Hence, safe and reliable charging of the high-voltage battery is guaranteed at any time.

It is particularly advantageous that the high-voltage battery itself is used to supply the pre-charge current in order to pre-charge the second charging terminal of the charging station. In this way, pre-charging is rendered independent of a pre-charging feature possibly provided by a charging station. Hence, charging of the high-voltage battery is facilitated at charging stations of many different kinds, significantly increasing the possibilities of charging the electric vehicle at many different charging stations worldwide (e.g. not only in Europe or North America, but also in China and Japan etc.).

Moreover, controlling the limited pre-charge current, i.e. controlling the pre-charge current not to exceed a predetermined current level, facilitates pre-charging the second charging terminal of the charging station with low power after the charging station is connected to the high-voltage battery but before starting the power transfer. This guarantees safe and reliable pre-charging.

It is to be noted that the pre-charge current flow stops (preferably automatically) when the desired pre-charge voltage is attained at the second charging terminal of the charging station, i.e. when the second charging terminal is pre-charged to the desired pre-charge voltage.

Additionally, even though the unidirectional power transfer component does not enable electric power to flow from the high-voltage battery to the second charging terminal of the charging station and, thus, the battery voltage is not detectable by the charging station, charging the high-voltage battery at charging stations, which require the battery voltage to be present/detectable at the first and second charging terminals of the charging station after electrical connection has been established between the charging station and the battery, and before the charging station transfers charging power to the battery, is also rendered possible by the invention since the pre-charge voltage is ensured to be present on the charging station-side, i.e. between the second charging terminal of the charging station and an input terminal of the unidirectional power transfer component (which also may be regarded as a simulated battery voltage for the charging station), thereby significantly increasing the possibilities of charging the high-voltage battery and use of the electric vehicle, respectively, at many different charging stations not only in Europe or North America, but also in China and Japan, for example.

Furthermore, a connection condition between the charging station and the high-voltage battery may be detected and verified on the vehicle-side and/or the charging station-side via so-called handshake signals which may be exchanged between the charging station and the vehicle-side. For example, it is well known to provide handshake signals on signal lines such as control pilot (CP) and proximity pilot (PP). The handshake signals may be used on the vehicle-side to determine that the charging station has been connected to the electric vehicle and the high-voltage battery, respectively, in order to begin the pre-charging procedure as disclosed by the invention.

According to advantageous embodiments, the pre-charge voltage is predetermined to have a voltage level essentially being the same as a voltage level handled by the high-voltage network established between the charging station and the high-voltage battery during charging thereof. The closer the pre-charge voltage is to the high-voltage present in the high-voltage network during the charging procedure, the smaller the compensating currents that will occur at the time the charging station begins to transfer charging power to charge the high-voltage battery.

In further preferred embodiments, the voltage at the second charging terminal is boosted by the unidirectional power transfer component to match the DC charging voltage of the charging station with the nominal battery voltage of the high-voltage battery.

Boosting the voltage may be accomplished by means of a DC/DC boost converter (also referred to as a DC/DC step-up converter), for example, which is configured to provide the respective voltage boost between its input and output terminals, wherein the input terminal is connected to the second charging terminal of the charging station, and the output terminal provides the boosted DC voltage to be fed to the second battery terminal of the high-voltage battery when charging the high-voltage battery.

It is particularly advantageous that only one single DC/DC boost converter is required for charging the high-voltage battery, however, without necessarily being limited to just one converter.

Boosting the voltage on the vehicle-side is particularly advantageous when using a high-voltage battery having a nominal battery voltage larger than the DC charging voltage provided by the charging station. For example, the nominal battery voltage may be 800 V while the charging station only provides a maximum DC charging voltage of 400 V. Boosting the DC charging voltage on the vehicle-side facilitates charging the high-voltage battery in spite of the lower DC charging voltage, thus further enlarging the possibilities of charging the high-voltage battery and the use of the electric vehicle, respectively, at many different charging stations worldwide (e.g. in Europe, North America, China, Japan etc.).

It is to be noted that charging a high-voltage battery having a nominal battery voltage of 800 V at a charging station supplying a DC charging voltage of also 800 V is not hindered by the invention. Although the DC/DC boost converter representing the unidirectional power transfer component will be present on the vehicle-side also in this case, pre-charging the second charging terminal of the charging station is always ensured since the pre-charging is effective on the charging station-side, i.e. between the second charging terminal of the charging station and an input terminal of the unidirectional power transfer component (i.e. DC/DC boost converter).

According to further advantageous embodiments, the pre-charge current is controlled by operating a transistor in its linear operation mode (i.e. without driving the transistor into saturation). In this way, fast and accurate control of the pre-charge current is ensured. Furthermore, the pre-charge current can be limited in the desired way to reduce the pre-charge power.

Thus, the generation of the appropriate pre-charge current may be implemented with manufacturing ease and low cost since adequate transistor devices are commonly available on the market at cheap prices.

Still further advantageous embodiments provide that the pre-charge current is controlled by a current mirror as a function of a predetermined input current flowing between the first and second battery terminals being a source path of the current mirror. To this end, the current mirror copies the predetermined input current through one active device (e.g. one or more transistors) by controlling the mirrored current in another active device (e.g. one or more transistors) while keeping the mirrored current constant regardless of loading.

Additionally, the mirrored current is limited by a current negative feedback in the source path enabling accurate control of the limited pre-charge current in order to perform the pre-charging with the desired low power.

Preferably, the pre-charge current may be limited to a range of about 10 mA to about 50 mA, preferably 20 mA to about 40 mA, particularly preferred to about 25 mA.

Further embodiments provide that the pre-charge current is conducted through a resistance network, i.e. an interconnection of several (ohmic) resistors, thus additionally facilitating to limit the pre-charge current in an efficient and flexible way according to specific application requirements.

Furthermore, according to other preferred embodiments, the pre-charge current may be selectively interrupted galvanically. Thus, pre-charging may be initiated by galvanically coupling a circuit branch conducting the pre-charge current with the high-voltage battery which supplies the electric power to generate the pre-charge current. On the other hand, galvanically decoupling the circuit branch from the high-voltage battery in order to interrupt the pre-charge current flow further enhances safety of operation. The selective galvanic interruption may be embodied by a controllable switch, relay, and the like.

According to yet further advantageous embodiments, the voltage between the first battery terminal and the second charging terminal of the charging station, i.e. between the first battery voltage and an input terminal of the unidirectional power transfer component, is monitored (continuously) while charging the high-voltage battery by the charging station takes place. To this end, appropriate voltage sensing means may be employed which may provide voltage measurement values to a digital processing unit (e.g. a microcontroller, microprocessor, and the like) for example. Monitoring the voltage between the first battery terminal and the input terminal of the unidirectional power transfer component prevents the pre-charging process from being automatically reactivated during an actual charging process (i.e. after the charging station initiated the power transfer to the high-voltage battery) if the DC charging voltage provided by the charging station drops significantly below the nominal battery voltage, for example below half of the nominal battery voltage.

It is to be understood that further preferred embodiments of the invention can also be any combination of features defined in the dependent claims with the features of the respective independent claim.

According to a second aspect, a charging device for charging a high-voltage battery of an electric vehicle (e.g. a hybrid electric vehicle (HEV) or a battery electric vehicle (BEV), wherein, without being limited thereto, the high-voltage battery may be a traction battery of the vehicle) at a charging station outputting a DC charging voltage (e.g. 400 V or 800 V, however, without necessarily being limited thereto) between first and second charging terminals, wherein a nominal battery voltage (e.g. 400 V or 800 V, however, without necessarily being limited thereto) is provided between first and second battery terminals of the high-voltage battery, comprises: first and second power input terminals being electrically connectable to the respective first and second charging terminals of the charging station, wherein the first power input terminal is connected to the first battery terminal, and the second power input terminal is connected to the second battery terminal; a unidirectional power transfer component interconnected in series between the second power input terminal and the second battery terminal, the power transfer component being configured to only allow unidirectional power flow to the second battery terminal of the high-voltage battery;

and an electronic control unit (e.g. a digital processing unit such as a microcontroller, microprocessor, and the like) configured to control a semiconductor device to selectively pre-charge the second power input terminal to a predetermined pre-charge voltage using a controllably limited pre-charge current supplied by electric power from the high-voltage battery after electrical contact has been established between the first and second power input terminals and the respective first and second charging terminals of the charging station, and before electric power is transferred from the charging station to the high-voltage battery.

It is to be noted that, with regard to the effects and advantages of the features regarding the charging device disclosed herein, reference may be made in its entirety to the corresponding, analogous features of the method for charging a high-voltage battery as well as the respective effects and advantages of those features disclosed herein. Therefore, features of the method for charging a high-voltage battery disclosed herein shall be regarded also as features applicable for the definition of embodiments of the charging device for charging a high-voltage battery according to the invention unless explicitly stated otherwise. Likewise, features of the charging device disclosed herein shall be regarded also as features applicable for the definition of embodiments of the method according to the invention unless explicitly stated otherwise. Hence, for the purposes of conciseness of this specification and an improved understanding of the principles of the present invention, a duplication of explanations of these analogous features, their effects and advantages is largely omitted without any such omissions to be construed as limitations.

According to advantageous embodiments, the unidirectional power transfer component is a DC/DC boost converter (also referred to as a DC/DC step-up converter) configured to boost the DC charging voltage provided by the charging station to match with the nominal battery voltage of the high-voltage battery. Thus, a high-voltage battery having a nominal battery voltage of 800 V may be charged at charging stations providing a DC charging voltage of less than the nominal battery voltage, for example a charging station providing a DC charging voltage of 400 V.

Further preferred embodiments provide that the semiconductor device comprises a transistor (e.g. a field-effect transistor, FET) being operated in its linear operation mode (i.e. outside a saturated state thereof) to precisely control and limit the pre-charge current in the desired way.

According to particularly preferred embodiments, the charging device further comprises a current mirror controlling the semiconductor device as a function of a predetermined input current flowing between the first and second battery terminals (also referred to as a source path of the current mirror). The current mirror copies the predetermined input current through one active device (e.g. one or more transistors) by controlling the mirrored current in another active device (e.g. one or more transistors) while keeping the mirrored current constant regardless of loading.

Additionally, the mirrored current is preferably limited by a current negative feedback in the source path enabling accurate control of the limited pre-charge current in order to perform the pre-charging with low power.

For example, the pre-charge current may be limited to a range of about 10 mA to about 50 mA, preferably 20 mA to about 40 mA, particularly preferred to about 25 mA, thereby requiring only low electric power to pre-charge the second charging terminal of the charging station even in the presence of high voltages of several hundred volts as is the case in the high-voltage network temporarily formed between the charging station and the high-voltage battery.

Yet further according to advantageous embodiments, the charging device may also comprise a resistance network (i.e. an interconnection of several (e.g. ohmic) resistances) connected in series with the semiconductor device.

Still further preferred embodiments provide a controllable switching element (e.g. a relay) configured to selectively isolate the semiconductor device from the second battery terminal galvanically.

The electronic control unit may be configured to open and close the switching element in order to initiate and/or stop the pre-charging event.

According to particularly preferred embodiments, the electronic control unit is configured to monitor the voltage between the first battery terminal and the second power input terminal, i.e. the voltage between the first battery terminal and an input terminal of the unidirectional power transfer component, while charging of the high-voltage battery by the charging station takes place. Monitoring the voltage (e.g. by means of appropriate voltage sensing means) between the first battery terminal and the second power input terminal prevents the pre-charging event from being automatically reactivated during an actual charging process (i.e. after the charging station initiated the power transfer to the high-voltage battery) if the DC charging voltage provided by the charging station drops significantly below the nominal battery voltage, for example below half of the nominal battery voltage.

It is to be noted that further preferred embodiments of the invention can also be any combination of features defined in the dependent claims with the features of the respective independent claim.

According to a third aspect, an electric vehicle having a high-voltage battery (e.g. a hybrid electric vehicle (HEV) or a battery electric vehicle (BEV), wherein, without being limited thereto, the high-voltage battery may be a traction battery of the vehicle), comprises a charging device for charging the high-voltage battery at a charging station outputting a DC charging voltage (e.g. 400 V or 800 V, however, without necessarily being limited thereto) between first and second charging terminals, wherein a nominal battery voltage (e.g. 400 V or 800 V, however, without necessarily being limited thereto) is provided between first and second battery terminals of the high-voltage battery, wherein the charging device comprises: first and second power input terminals being electrically connectable to the respective first and second charging terminals of the charging station, wherein the first power input terminal is connected to the first battery terminal, and the second power input terminal is connected to the second battery terminal; a unidirectional power transfer component interconnected in series between the second power input terminal and the second battery terminal, the power transfer component being configured to only allow unidirectional power flow to the second battery terminal of the high-voltage battery; and an electronic control unit (e.g. a digital processing unit such as a microcontroller, microprocessor, and the like) configured to control a semiconductor device to selectively pre-charge the second power input terminal to a predetermined pre-charge voltage using a controllably limited pre-charge current supplied by electric power from the high-voltage battery after electrical contact has been established between the first and second power input terminals and the respective first and second charging terminals of the charging station, and before electric power is transferred from the charging station to the high-voltage battery.

It is to be noted that, also with regard to the effects and advantages of the features regarding the electric vehicle disclosed herein, reference may be made in its entirety to the corresponding, analogous features of the method and charging device each for charging a high-voltage battery as well as the respective effects and advantages of those features disclosed herein. Therefore, features of the method and charging device each for charging a high-voltage battery disclosed herein shall be regarded also as features applicable for the definition of embodiments of the electric vehicle according to the invention unless explicitly stated otherwise. Likewise, features of the electric vehicle disclosed herein shall be regarded also as features applicable for the definition of embodiments of the method and charging device according to the invention unless explicitly stated otherwise. Hence, for the purposes of conciseness of this specification and an improved understanding of the principles of the present invention, a duplication of explanations of these analogous features, their effects and advantages is largely omitted without any such omissions to be construed as limitations.

According to particularly preferred embodiments, the high-voltage battery has a nominal battery voltage of 800 V, wherein the unidirectional power transfer component is a DC/DC boost converter (also referred to as a DC/DC step-up converter) which is configured to boost the DC charging voltage provided by the charging station to match with the nominal battery voltage.

It is to be understood that further preferred embodiments of the invention can also be any combination of features defined in the dependent claims with the features of the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 illustrates a simplified diagram of an exemplary embodiment of a charging device and an electric vehicle each according to the invention.

FIG. 2 illustrates a simplified diagram of a pre-charging part of the charging device of FIG. 1 in more detail.

In the Figures, like reference signs refer to like objects throughout. Objects in the Figs. are not necessarily drawn to scale.

DETAILED DESCRIPTION OF THE EMBODIMENTS

Various embodiments of the invention will now be described by means of the Figures.

Figure 1:
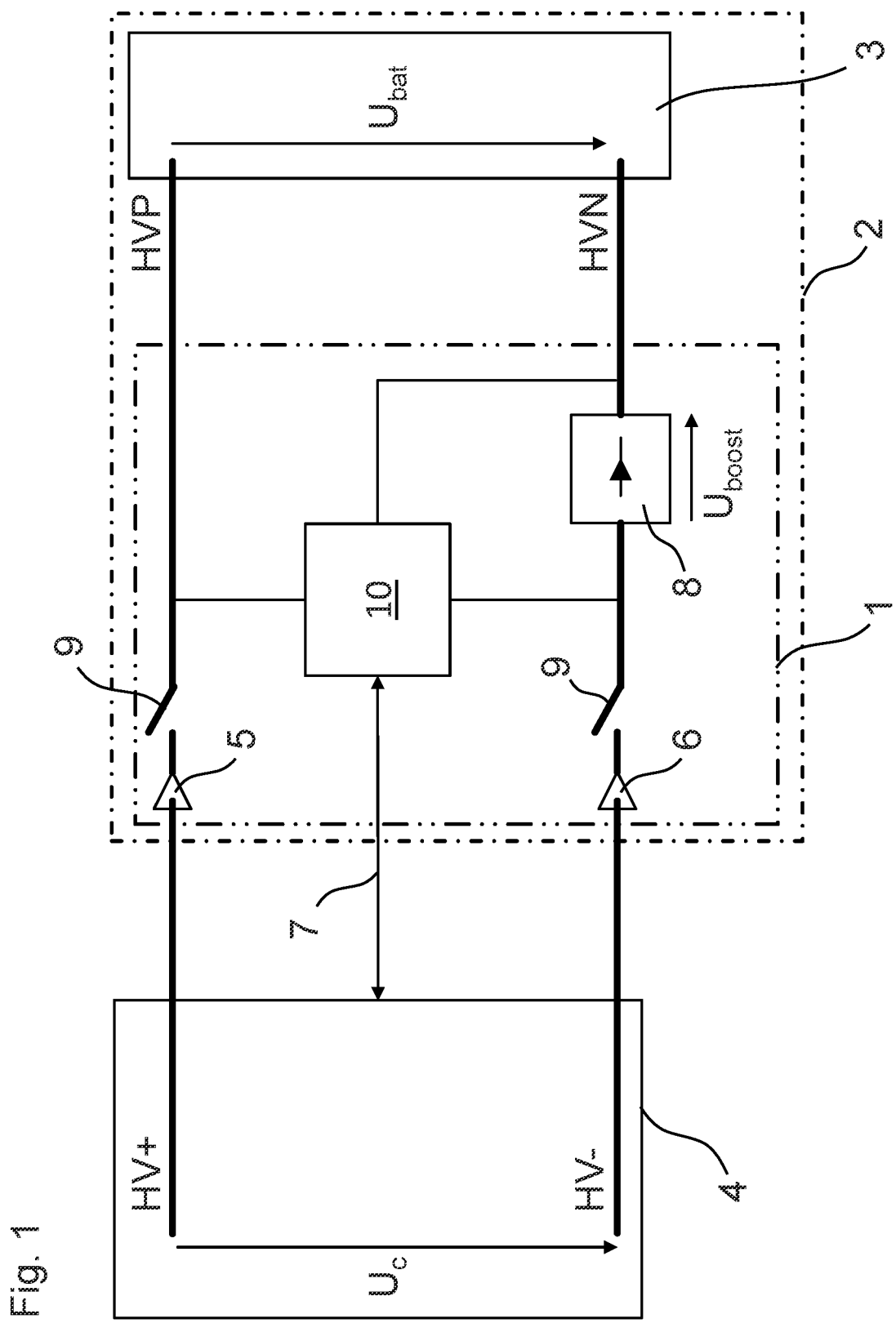

FIG. 1 schematically shows a simplified diagram of an exemplary embodiment of a charging device 1 and a schematically depicted electric vehicle 2 (e.g. a HEV or a BEV) each for charging the high-voltage (HV) battery 3 of the electric vehicle 2 at a charging station 4 according to the invention.

It is to be noted that the vehicle 2 comprises further components such as an electric motor (not shown) etc. which may receive electric power supplied by the high-voltage battery 3. Furthermore, the high-voltage battery 3 may be constituted of several battery cells (also not shown) interconnected in series and/or in parallel to provide the battery voltage as required by the specific application.

In the embodiment shown in FIG. 1, the HV battery 3 has a nominal battery voltage $U_{bat}$ of 800 V (however, without being limited thereto) between a first (positive) battery terminal HVP and a second (negative) battery terminal HVN.

The charging station 4 in the present example outputs a DC charging voltage $U_c$ of 400 V (however, without being limited thereto) between a first (positive) charging terminal HV+ and second (negative) charging terminal HV−. Thus, in the present case, the DC charging voltage $U_c$ (here 400 V) of the charging station 4 is less than the nominal battery voltage $U_{bat}$ (here 800 V) of the high-voltage battery 3. However, the invention is not limited thereto. For example, the charging voltage may be equal to the nominal battery voltage too.

Further, FIG. 1 shows first and second power input terminals 5, 6 which are electrically connected to the respective first and second charging terminals HV+, HV− of the charging station 4, wherein the first power input terminal 5 is connected to the first battery terminal HVP, and the second power input terminal 6 is connected to the second battery terminal HVN.

Furthermore, the exemplary charging device 1 of FIG. 1 may be communicatively connected to the charging station 4 by at least one handshake signal line 7 on which status information about the charging station 4 and/or the charging device 1 and/or the high-voltage battery 3 and/or the electric vehicle 2 may be transmitted/exchanged. For example, the charging station 4 may inform the charging device 1 via the handshake line 7 that it provides a DC charging voltage $U_c$ of 400 V, 800 V, or other, and the like. Further, the handshake line 7 may serve as a detection means for the charging station 4 and/or the charging device 1 that the other one of the charging device 1 and charging station 4, respectively, has established contact therewith. For example, commonly known handshake signals such as control pilot (CP) and proximity pilot (PP) may be provided on the signal line(s) 7 to convey the above-mentioned information.

Further, the exemplary charging device 1 of FIG. 1 comprises a DC/DC boost (step-up) converter 8 as a unidirectional power transfer component interconnected in series between the second power input terminal 6 and the second battery terminal HVN. The DC/DC boost converter 8 is configured to boost the DC charging voltage $U_c$ (in the present case 400 V) to match with the nominal battery voltage $U_{bat}$ (in the present case 800 V), i.e., the DC/DC boost converter 8 boosts or steps-up the charging voltage $U_c$ provided by the charging station 4 by 400 V in the present case, i.e. the step-up voltage $U_{boost}$ is 400 V in the exemplary case shown in FIG. 1, however, without necessarily being limited thereto.

Furthermore, the DC/DC boost converter 8 is configured to only allow a unidirectional power flow from the second power input terminal 6 (i.e. the second charging terminal HV−) to the second battery terminal HVN. As a consequence, the battery voltage $U_{bat}$ is not detectable by the charging station 4 after the high-voltage battery 3 is connected to the charging station 4 via the charging device 1.

Still further, the exemplary charging device 1 comprises switching elements 9 (e.g. relays) one of which is respectively interposed between the first and second power input terminals 5, 6 and the respective first and second battery terminals HVP, HVN as shown in FIG. 1. The charging device 1 may be configured to control the switching elements 9 in order to establish electrical contact between the first power input terminal 5 and the first battery terminal HVP as well as between the second power input terminal 6 and the unidirectional power transfer component 8 and the second battery terminal HVN, respectively.

Possibly, the switching elements 9 may be switched by other means (not shown) than the charging device 1. For example, the switching elements 9 may be automatically closed by a mechanism (not shown) upon connecting a charge cable (also not shown) between the charging station 4 and the electric vehicle 2.

In any case, the charging device 1 according to the illustrated embodiment may be configured at least to detect an open and/or closed condition of the switching elements 9 in order to determine that the charging station 4 has been connected to the first and second power input terminals 5, 6 of the charging device 1.

Figure 2:
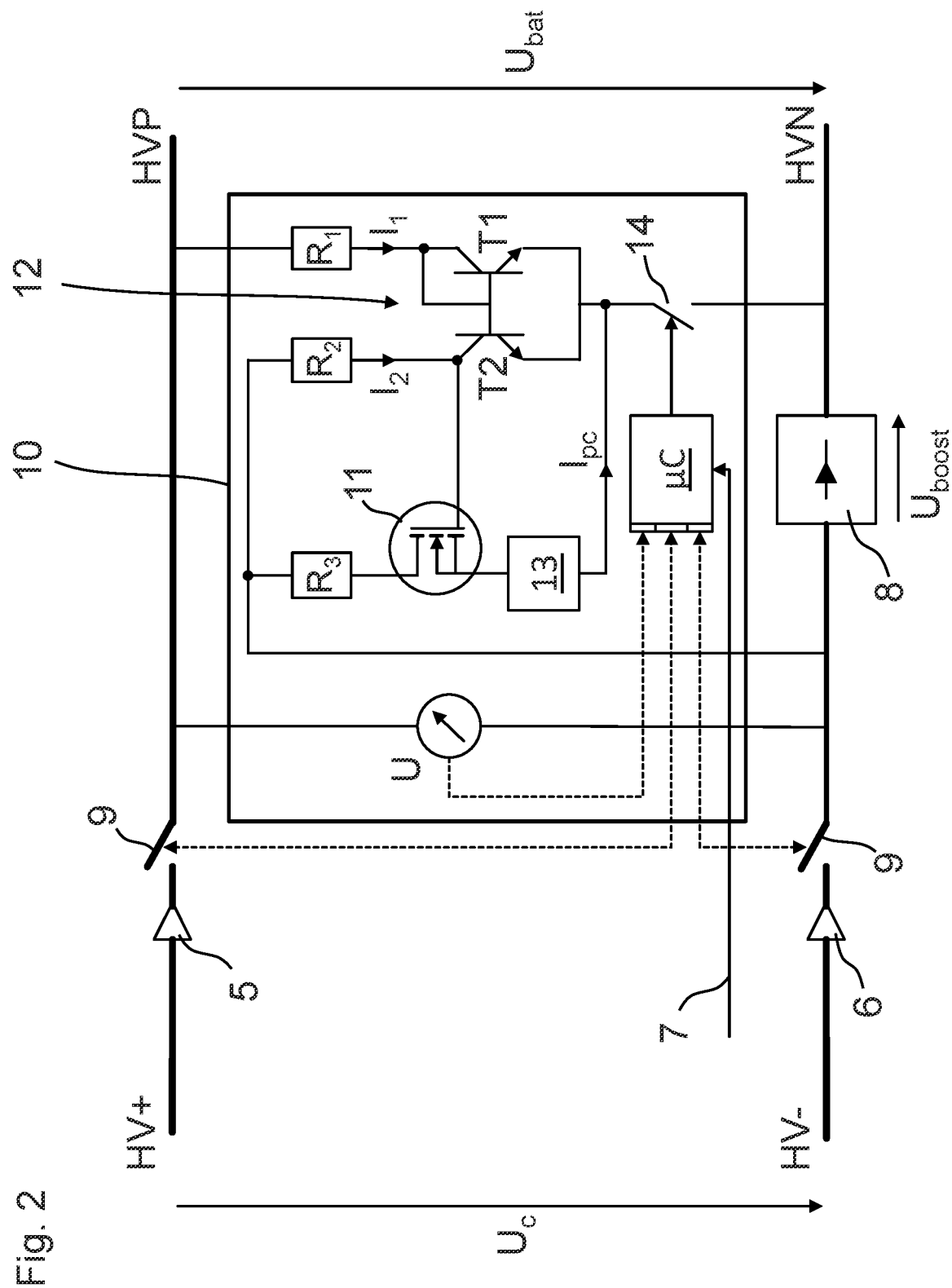

FIG. 1 also depicts that the charging device 1 comprises a pre-charging functional component 10, a simplified diagram thereof is illustrated in more detail in FIG. 2.

With regard to FIG. 2, functional component 10 of the charging device 1 is shown to comprise an electronic control unit, which, in the present case, is embodied as a digital processing unit such as a microcontroller μC, however, without necessarily being limited thereto. Other digital processing units may also be employed, e.g. a microprocessor, and the like.

The electronic control unit μC is configured to control a semiconductor device 11, a field-effect transistor (FET) in the present case, to selectively pre-charge the second power input terminal 6 to a predetermined pre-charge voltage using a well-defined pre-charge current $I_{pc}$. The pre-charge current $I_{pc}$ is supplied by electric power from the high-voltage battery 3, i.e. from the electric power provided between the battery terminals HVP and HVN.

To this end, the semiconductor device 11, i.e. the FET transistor in the present case, is operated in its linear operation mode to accurately control the pre-charge current $I_{pc}$. In turn, as shown in FIG. 2, the transistor 10 (i.e. the gate of the FET) is controlled by a current mirror 12 formed essentially by two transistors T1, T2. In turn, the current mirror 12 is controlled as a function of a predetermined input current $I_1$ flowing in a source path of the current mirror 12, i.e. between the first and second battery terminals HVP, HVN. As is generally known, the current mirror 12 copies the predetermined input current $I_1$ to the mirrored current $I_2$ while keeping the mirrored current $I_2$ constant regardless of loading. Additionally, the mirrored current $I_2$ is limited by a current negative feedback in the source path enabling accurate control of the pre-charge current $I_{pc}$ in order to perform the pre-charging with the desired low power, wherein the pre-charge current $I_{pc}$ is preferably limited to a range of about 10 mA to about 50 mA, and particularly to about 25 mA to about 30 mA.

The electronic control unit μC is thus configured to selectively pre-charge the second power input terminal 6 to a predetermined pre-charge voltage using the controllably limited pre-charge current $I_{pc}$ supplied by the electric power from the high-voltage battery 3 after electrical contact has been established between the first and second power input terminals 5, 6 and the respective first and second charging terminals HV+, HV− of the charging station 4, and before electric power is transferred from the charging station 4 to the high-voltage battery 3. In the charging device 1 illustrated in FIGS. 1 and 2, the switching elements 9 will also be closed in order to pre-charge the second power input terminal 6 of the charging device.

It is to be noted that the pre-charge voltage which is generated by the pre-charge current $I_{pc}$ at the second power input terminal 6 is predetermined to have a voltage level essentially being the same as a voltage level handled by the high-voltage network established between the charging station 4 and the high-voltage battery 3, i.e. a having essentially the level of the nominal high-voltage $U_{bat}$ of the battery 3. Further, as shown in FIG. 2, additional (ohmic) resistances $R_1$, $R_2$, $R_3$ may be provided, and their individual resistance values may be selected according to the specific application requirements.

As also shown in FIG. 2, the exemplary charging device 1 comprises a resistance network 13 which may be an interconnection of several individual (ohmic) resistances (not shown). The resistance network 13 is connected in series with the semiconductor device 11 in the present case.

Furthermore, the charging device 1 comprises a controllable switching element 14 configured to selectively isolate the semiconductor device 11 from the second battery terminal HVN galvanically. The switching element 14 may be a relay, for example.

As further shown in FIG. 2, the switching element 14 is controlled by the electronic control unit μC. Thus, the pre-charging process can be initiated by the electronic control unit µC after it has detected that electrical contact has been established between the first and second power input terminals 5, 6 and the respective first and second charging terminals HV+, HV− of the charging station 4, and before electric power is transferred from the charging station 4 to the high-voltage battery 3.

Still further, in the exemplary charging device 1 shown in FIG. 2, the electronic control unit µC is also configured to monitor a voltage U between the first battery terminal HVP and the second charging terminal HV− of the charging station 4, i.e. the voltage U between the first battery terminal HVP and the second power input terminal 6, while charging the high-voltage battery 3 is performed by the charging station 4. Monitoring this voltage U between the first battery terminal HVP and the second power input terminal 6 prevents the pre-charging process from being automatically reactivated during an actual charging process (i.e. after the charging station 4 initiated the power transfer to the high-voltage battery 3) if the DC charging voltage $U_c$ provided by the charging station 4 should drop (e.g. temporarily) significantly below the nominal battery voltage $U_{bat}$, for example below half of the nominal battery voltage.

The invention ensures that, even though the unidirectional power transfer component 8 does not enable electric power to flow from the high-voltage battery 3 to the second charging terminal HV− of the charging station 4 and, thus, the battery voltage $U_{bat}$ is not detectable per se by the charging station 4, the high-voltage battery 3 can be charged at charging stations (such as charging stations in Japan (CHAdeMO) or China (GB/T) for example) which require the battery voltage $U_{bat}$ to be present (and detectable) at the first and second charging terminals HV+, HV− of the charging station 4 in order for the charging station to supply the charging power to the battery 3.

Pre-charging the second power input terminal 6 as taught by the invention, i.e. using the pre-charge current $I_{pc}$ supplied by power from the high-voltage battery 3, may also be regarded as "simulating" the battery voltage $U_{bat}$ to the charging station 4. In consequence, the charging station 4 will always be able to detect the "simulated" voltage between the first and second power input terminals 5, 6 of the charging device 1 after pre-charging the second power input terminal 6 which, in turn, activates the delivery of the charging power to the high-voltage battery 3 by the charging station 4.

Hence, in comparison to commonly known charging devices, the invention facilitates charging a high-voltage battery of an electric vehicle at a significantly increased number of different charging stations including Europe, North America, China, and Japan, for example.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

REFERENCE SIGNS

1 Charging device
2 Electric vehicle
3 High-voltage battery
4 Charging station
5 First power input terminal
6 Second power input terminal
7 Handshake signal line(s)
8 Unidirectional power transfer component
9 Switching element
10 Pre-charging functional component
11 Semiconductor device
12 Current mirror
13 Resistance network
14 Switching element
HV+ Positive high-voltage side at charging station
HV− Negative high-voltage side at charging station
HVP Positive high-voltage side at high-voltage battery
HVN Negative high-voltage side at high-voltage battery
$I_1$ Source current
$I_1$ Mirrored current
$I_{pc}$ Pre-charge current
µC Electronic control unit
$R_x$ Resistance
T1 Transistor
T2 Transistor
U Voltage
$U_{bat}$ Nominal battery voltage
$U_{boost}$ Step-up voltage
$U_c$ Charging voltage

The invention claimed is:

1. A method for charging a high-voltage battery of an electric vehicle, comprising:
   providing the high-voltage battery having a nominal battery voltage between first and second battery terminals,
   providing a charging station outputting a DC charging voltage between first and second charging terminals,
   electrically connecting the first and second charging terminals and the respective first and second battery terminals without electric power being transferred from the charging station to the high-voltage battery, wherein the second charging terminal is connected to the second battery terminal via a unidirectional power transfer component interposed therebetween only allowing unidirectional power flow from the second charging terminal to the second battery terminal,
   selectively pre-charging the second charging terminal to a predetermined pre-charge voltage using a controllably limited pre-charge current supplied by electric power from the high-voltage battery, and
   transferring electric power from the charging station to the high-voltage battery after the predetermined pre-charge voltage has been attained at the second charging terminal of the charging station,
   wherein the pre-charge current is controlled by operating a transistor in its linear operation mode.

2. The method as claimed in claim 1, wherein the voltage at the second charging terminal is boosted by the unidirectional power transfer component to match the DC charging voltage of the charging station with the nominal battery voltage of the high-voltage battery.

3. The method as claimed in claim 1, wherein the pre-charge voltage is predetermined to have a voltage level being the same as a voltage level handled by the high-voltage network established by the charging station and the high-voltage battery.

4. The method as claimed in claim 1, wherein the pre-charge current is controlled by a current mirror as a function of a predetermined input current flowing between the first and second battery terminals.

5. The method as claimed in claim 1, wherein the pre-charge current is limited to a range of about 10 mA to about 50 mA.

6. The method as claimed in claim 1, wherein the pre-charge current is conducted through a resistance network.

7. The method as claimed in claim 1, wherein the pre-charge current may be selectively interrupted galvanically.

8. The method as claimed in claim 1, wherein the voltage between the first battery terminal and the second charging terminal of the charging station is monitored during charging the high-voltage battery.

9. A charging device for charging a high-voltage battery of an electric vehicle at a charging station outputting a DC charging voltage between first and second charging terminals, wherein a nominal battery voltage is provided between first and second battery terminals of the high-voltage battery, the charging device comprising:
   first and second power input terminals being electrically connectable to the respective first and second charging terminals of the charging station, wherein the first power input terminal is connected to the first battery terminal, and the second power input terminal is connected to the second battery terminal,
   a unidirectional power transfer component interconnected in series between the second power input terminal and the second battery terminal, the power transfer component being configured to only allow unidirectional power flow from the second power input terminal to the second battery terminal of the high-voltage battery, and
   an electronic control unit configured to control a semiconductor device to selectively pre-charge the second power input terminal to a predetermined pre-charge voltage using a controllably limited pre-charge current supplied by electric power from the high-voltage battery after electrical contact has been established between the first and second power input terminals and the respective first and second charging terminals of the charging station, and before electric power is transferred from the charging station to the high-voltage battery,
   wherein the semiconductor device comprises a transistor being operated in its linear operation mode to control the pre-charge current.

10. The charging device as claimed in claim 9, wherein the unidirectional power transfer component is a DC/DC boost converter configured to boost the DC charging voltage to match with the nominal battery voltage.

11. The charging device as claimed in claim 9, wherein the pre-charge voltage is predetermined to have a voltage level being the same as a voltage level handled by the high-voltage network established by the charging station and the high-voltage battery.

12. The charging device as claimed in claim 9, further comprising a current mirror controlling the semiconductor device as a function of a predetermined input current flowing between the first and second battery terminals.

13. The charging device as claimed in claim 9, wherein the pre-charge current is limited to a range of about 10 mA to about 50 mA.

14. The charging device as claimed in claim 9, further comprising a resistance network connected in series with the semiconductor device.

15. The charging device as claimed in claim 9, further comprising a controllable switching element configured to selectively isolate the semiconductor device from the second battery terminal galvanically.

16. The charging device as claimed in claim 15, wherein the electronic control unit is configured to open and close the switching element.

17. The charging device as claimed in claim 9, wherein the electronic control unit is configured to monitor the voltage between the first battery terminal and the second charging terminal of the charging station during charging the high-voltage battery.

18. An electric vehicle having a high-voltage battery, comprising a charging device for charging the high-voltage battery at a charging station outputting a DC charging voltage between first and second charging terminals, wherein a nominal battery voltage is provided between first and second battery terminals of the high-voltage battery, the charging device comprising:
   first and second power input terminals being electrically connectable to the respective first and second charging terminals of the charging station, wherein the first power input terminal is connected to the first battery terminal, and the second power input terminal is connected to the second battery terminal,
   a unidirectional power transfer component interconnected in series between the second power input terminal and the second battery terminal, the power transfer component being configured to only allow unidirectional power flow to the second battery terminal of the high-voltage battery, and
   an electronic control unit configured to control a semiconductor device to selectively pre-charge the second power input terminal to a predetermined pre-charge voltage using a controllably limited pre-charge current supplied by electric power from the high-voltage battery after electrical contact has been established between the first and second power input terminals and the respective first and second charging terminals of the charging station, and before electric power is transferred from the charging station to the high-voltage battery
   wherein the semiconductor device comprises a transistor being operated in its linear operation mode to control the pre-charge current.

19. The electric vehicle as claimed in claim 18, wherein the high-voltage battery has a nominal battery voltage of 800 V, and wherein the unidirectional power transfer component is a DC/DC boost converter configured to boost the DC charging voltage provided by the charging station to match with the nominal battery voltage.

* * * * *